US008570927B2

(12) United States Patent
Sahara (10) Patent No.: US 8,570,927 B2
(45) Date of Patent: Oct. 29, 2013

(54) RADIO COMMUNICATION SYSTEM, TRANSMISSION DEVICE, AND COMMUNICATION SIGNAL TRANSMISSION METHOD

(75) Inventor: Toru Sahara, Yokohama (JP)

(73) Assignee: KYOCERA Corporation, Kyoto (JP)

(*) Notice: Subject to any disclaimer, the term of this patent is extended or adjusted under 35 U.S.C. 154(b) by 262 days.

(21) Appl. No.: 13/126,151

(22) PCT Filed: Oct. 28, 2009

(86) PCT No.: PCT/JP2009/068510
§ 371 (c)(1),
(2), (4) Date: Apr. 26, 2011

(87) PCT Pub. No.: WO2010/050512
PCT Pub. Date: May 6, 2010

(65) Prior Publication Data
US 2011/0199935 A1    Aug. 18, 2011

(30) Foreign Application Priority Data

Oct. 29, 2008    (JP) .................................. 2008-278946

(51) Int. Cl.
*G08C 17/00*    (2006.01)
*H04W 4/00*    (2009.01)
*H04L 27/28*    (2006.01)

(52) U.S. Cl.
USPC ............................ 370/311; 370/328; 375/260

(58) Field of Classification Search
None
See application file for complete search history.

(56) References Cited

U.S. PATENT DOCUMENTS

| 2005/0117520 A1* | 6/2005 | Miyoshi ........................ 370/238 |
| 2005/0123138 A1* | 6/2005 | Abe et al. ...................... 380/255 |
| 2008/0125109 A1  | 5/2008 | Larsson et al. |
| 2009/0109886 A1* | 4/2009 | Yamamoto ..................... 370/311 |
| 2011/0201368 A1* | 8/2011 | Faccin et al. ................. 455/507 |
| 2011/0235728 A1* | 9/2011 | Karabinis ..................... 375/260 |

FOREIGN PATENT DOCUMENTS

| CN | 1910879 A     | 2/2007 |
| JP | 2007-208719 A | 8/2007 |

OTHER PUBLICATIONS

3GPP Support Office 3rd Generation Partnership Project; Technical Specification Group Radio Access Network; Evolved Universal Terrestrial Radio Access (E-UTRA); Physical Channels and Modulation (Release 8). Sep. 2008.

(Continued)

*Primary Examiner* — Melanie Jagannathan
(74) *Attorney, Agent, or Firm* — Procopio, Cory, Hargreaves & Savitch LLP (57) ABSTRACT

Provided are a radio communication system, a transmission device, and a communication signal transmission method, which enable a reception device to correctly demodulate a communication signal without performing a feedback of a propagation path characteristic from the reception device to the transmission device. The transmission device includes an SVD calculation unit for calculating, as an inverse-direction propagation path characteristic, a propagation path characteristic exhibited in a direction from the reception device toward the transmission device and for calculating a forward-direction propagation path characteristic being a propagation path characteristic exhibited in a direction from the transmission device toward the reception device, based on the inverse-direction propagation path characteristic, reception-side calibration information regarding radio reception units notified from the reception device, and transmission-side calibration information regarding radio transmission units, and a weight synthesis unit for generating the communication signal weighted based on the forward-direction propagation path characteristic.

7 Claims, 4 Drawing Sheets

(56) References Cited

OTHER PUBLICATIONS

International Search Report dated Dec. 1, 2009 issued by the Japanese Patent Office for International Application No. PCT/JP2009/068510.

Taira et al., "Multi-carrier MIMO System ni OKeru Shuhasu Keikin MMSE-ho no Densoro Suitei Seido", The Institute of Electronics, Information and Communication Engineers, Technical Report, Oct. 21, 2004, RCS2004-187 (Oct. 2004), vol. 104, No. 398, pp. 87-92.

Nouda et al., "TDD Hoshiki ni Okeru Sohoko Channel Sokutei o Mochiita Antenna Array Jiko Calibration", The Institute of Electronics, Information and Communication Engineers, Technical Report, May 22, 2008, RCS2008-12 (May 2008), vol. 108, No. 61, pp. 69-74.

IEEE Standard for Local and Metropolitan Area Networks Part 16: Air Interface for Fixed and Mobile Broadband Wireless Access Systems Amendment2: Physical and Medium Access Control Layers for Combined Fixed and Mobile Operation in Licensed Bands and Corrigendum 1, IEEE Computer Society and the IEEE Microwave Theory and Techniques Society, Feb. 28, 2006, pp. 421-422.

International Preliminary Report on Patentability and Written Opinion issued for International Application No. PCT/JP2009/068510.

\* cited by examiner

PRIOR ART

RADIO COMMUNICATION SYSTEM, TRANSMISSION DEVICE, AND COMMUNICATION SIGNAL TRANSMISSION METHOD

TECHNICAL FIELD

The present invention relates to a radio communication system, a transmission device, and a communication signal transmission method.

BACKGROUND ART

For radio communications, there is a multi-input multi-output (MIMO) mode as a communication mode that realizes an improvement in communication speed. The MIMO mode is a technology for communications performed between communication devices provided with a plurality of antennas.

Figure 5:
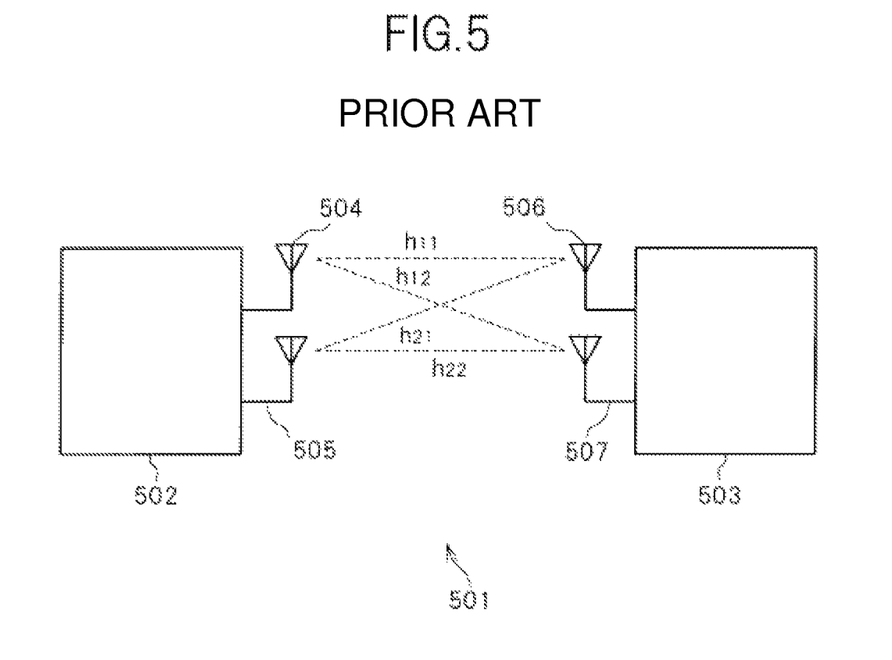
FIG. 5 A diagram illustrating a configuration of a radio communication system in a MIMO mode.

FIG. 5 is a diagram illustrating a configuration of a radio communication system 501 in the MIMO mode.

In the MIMO mode, a transmission-side communication device (transmission device) 502 divides transmission data into a plurality of data parts and distributes the generated data parts to a plurality of transmission antennas, thereby transmitting the data parts from the respective antennas with the same frequency. FIG. 5 illustrates an example of being provided with two transmission antennas 504 and 505.

A reception-side communication device (reception device) 503 receives signals transmitted from the transmission antennas 504 and 505 by a plurality of reception antennas (here, two reception antennas 506 and 507). From the received signals, the reception device 503 acquires the plurality of data parts transmitted from the respective transmission antennas by using a propagation path characteristic $H_{fwd}$ exhibited in a direction from the transmission device 502 toward the reception device 503 between the transmission antennas 504 and 505 and the reception antennas 506 and 507, and generates reception data by combining the data parts.

Here, the propagation path characteristic $H_{fwd}$ is expressed by a matrix having elements of propagation path characteristics $h_{11}$, $h_{12}$, $h_{21}$, and $h_{22}$ exhibited from the respective transmission antennas 504 and 505 toward the respective reception antennas 506 and 507.

The communications based on the MIMO mode can realize a communication speed obtained by being multiplied by the number of transmission antennas at maximum in comparison with a case of using one antenna.

In addition, there is an SVD-MIMO mode in which a perpendicular propagation path characteristic, which is obtained by subjecting the propagation path characteristic $H_{fwd}$ to singular value decomposition (SVD) and is equivalent to the propagation path characteristic $H_{fwd}$, is used by the transmission device 502 and the reception device 503.

Described below is an outline of the SVD-MIMO mode in which signals are transmitted from the transmission device 502 provided with M (here, two) transmission antennas to the reception device provided with N (here, two) reception antennas.

In the communications based on the SVD-MIMO mode, first, the transmission device 502 transmits transmission-side known signals from the respective transmission antennas 504 and 505 to the respective reception antennas 506 and 507.

The reception device 503 uses transmission-side known signals that are previously grasped and the transmission-side known signals that have been transmitted from the transmission antennas 504 and 505 and received by the reception antennas 506 and 507 to calculate the propagation path characteristic $H_{fwd}$ exhibited in the direction from the transmission device 502 toward the reception device 503. The propagation path characteristic $H_{fwd}$ is a radio channel matrix of N rows and M columns.

Subsequently, the reception device 503 subjects the propagation path characteristic $H_{fwd}$ to the singular value decomposition as shown in Expression (1).

[Numeral 1]

$$H_{fwd} = U \sum V^H \quad (1)$$

$$\sum = \begin{bmatrix} \sqrt{\lambda_1} & & & \\ & \sqrt{\lambda_2} & & 0 \\ & & \ddots & \\ 0 & & & \sqrt{\lambda_m} \end{bmatrix}$$

Here, "U" represents a unitary matrix of M rows and M columns, "V" represents a unitary matrix of N rows and N columns, and "$H$" appended to "V" represents a conjugate transpose.

The reception device 503 performs a feedback of the obtained unitary matrix V to the transmission device 502.

The transmission device 502 performs weighting by multiplying a vector s formed of M (that is, two) transmission signals by the unitary matrix V to generate a signal Vs, and transmits the obtained signal Vs from the transmission antennas 504 and 505.

The reception device 503 receives a reception signal vector y, which is formed of N (that is, two) signals on which the respective elements of Vs transmitted from the transmission antennas 504 and 505 are superposed, by the reception antennas 506 and 507. The reception device 503 performs demodulation by multiplying the signals y by the conjugate transpose $U^H$ of the unitary matrix U obtained by the singular value decomposition shown in Expression (1).

In this manner, between the plurality of transmission antennas 504 and 505 and the plurality of reception antennas 506 and 507, exchanges of data items having no correlation therebetween are realized.

This mode is referred to as "closed loop SVD-MIMO mode" because the reception device 503 performs a feedback of the unitary matrix V to the transmission device 502, and is disclosed in, for example, Non Patent Literature 1.

PRIOR ART DOCUMENT

Non-Patent Document

Non Patent Literature 1: IEEE Computer Society and the IEEE Microwave Theory and Techniques Society, "IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1", (USA), Feb. 28, 2006, pp. 421-422

DISCLOSURE OF THE INVENTION

Problems to be Solved by the Invention

However, in the above-mentioned closed loop SVD-MIMO mode, it requires a time on the order of several frames for the reception device 503 to perform a feedback of a unitary matrix V representing a propagation path characteristic to the transmission device 502. If a propagation path has changed due to, for example, movement or the like of the transmission device 502 or the reception device 503 during the feedback, the weighting performed based on the unitary matrix V when the transmission device 502 performs transmission is no longer adapted to the propagation path used in actuality, and a communication signal thus transmitted is not demodulated correctly by the reception device 503.

The present invention has been made in view of the above-mentioned conventional problem, and an object thereof is to provide a radio communication system, a transmission device, and a communication signal transmission method, in which a reception device can correctly demodulate a communication signal without performing a feedback of a propagation path characteristic from the reception device to a transmission device.

Means for Solving the Problems

In order to solve the above-mentioned problem, a radio communication system according to the present invention includes: a reception device provided with a plurality of reception antennas and a plurality of radio reception units respectively connected to the plurality of reception antennas; and a transmission device provided with a plurality of transmission antennas and a plurality of radio transmission units respectively connected to the plurality of transmission antennas, the reception device being configured to acquire a plurality of communication signals transmitted respectively from the plurality of transmission antennas based on a propagation path characteristic exhibited in a direction from the transmission device toward the reception device, in which: the reception device includes reception-side calibration information notifying means for notifying the transmission device of reception-side calibration information regarding the plurality of radio reception units; and the transmission device includes: inverse-direction propagation path characteristic calculating means for calculating, as an inverse-direction propagation path characteristic, a propagation path characteristic exhibited in a direction from the reception device toward the transmission device; forward-direction propagation path characteristic calculating means for calculating a forward-direction propagation path characteristic corresponding to the propagation path characteristic exhibited in the direction from the transmission device toward the reception device, based on the inverse-direction propagation path characteristic, the reception-side calibration information notified from the reception device, and transmission-side calibration information regarding the plurality of radio transmission units; and communication signal transmitting means for transmitting the plurality of communication signals weighted based on the forward-direction propagation path characteristic respectively from the plurality of transmission antennas.

Further, in the radio communication system according to the present invention: the propagation path characteristic exhibited in the direction from the transmission device toward the reception device is calculated based on a plurality of transmission-side known signals transmitted respectively from the plurality of transmission antennas and a plurality of superposed signals that are formed of the plurality of transmission-side known signals superposed one on another and are received respectively by the plurality of reception antennas; and the propagation path characteristic exhibited in the direction from the reception device toward the transmission device is calculated based on a plurality of reception-side known signals transmitted respectively from the plurality of reception antennas and a plurality of superposed signals that are formed of the plurality of reception-side known signals superposed one on another and are received respectively by the plurality of transmission antennas.

Further, in the radio communication system according to the present invention: the reception-side calibration information is determined based on variation amounts of reference signals that respectively pass through the plurality of radio reception units after being input to the plurality of reception antennas and variation amounts of reference signals that are respectively output from the plurality of reception antennas after passing through the plurality of radio reception units; and the transmission-side calibration information is determined based on variation amounts of reference signals that respectively pass through the plurality of radio transmission units after being input to the plurality of transmission antennas and variation amounts of reference signals that are respectively output from the plurality of transmission antennas after passing through the plurality of radio transmission units.

Further, in the radio communication system according to the present invention, the variation amount includes at least one of an amplitude variation amount and a phase variation amount.

Further, in the radio communication system according to the present invention: the radio communication system is an MIMO system including the transmission device provided with M transmission antennas and the reception device provided with N reception antennas; the propagation path characteristic exhibited in a direction from the plurality of transmission antennas toward the plurality of reception antennas is a radio channel matrix of N rows and M columns; the propagation path characteristic exhibited in a direction from the plurality of reception antennas toward the plurality of transmission antennas is a radio channel matrix of M rows and N columns; the reception-side calibration information is a calibration value vector formed of N elements; and the transmission-side calibration information is a calibration value vector formed of M elements.

Further, in the radio communication system according to the present invention: the radio communication system is an SVD-MIMO system; and the plurality of communication signals transmitted respectively from the plurality of transmission antennas are weighted based on a complex conjugate transpose of an Mth-order unitary matrix obtained by subjecting the propagation path characteristic exhibited in the direction from the transmission device toward the reception device to singular value decomposition.

Further, according to the present invention, there is provided a transmission device which is configured to transmit a plurality of communication signals to a reception device that is provided with a plurality of reception antennas and a plurality of radio reception units respectively connected to the plurality of reception antennas and is configured to acquire the plurality of communication signals transmitted respectively from a plurality of transmission antennas based on a propagation path characteristic exhibited in a direction from the transmission device toward the reception device, the transmission device including: the plurality of transmission antennas; a plurality of radio transmission units respectively connected to the plurality of transmission antennas; inverse-direction propagation path characteristic calculating means for calculating, as an inverse-direction propagation path characteristic, a propagation path characteristic exhibited in a direction from the reception device toward the transmission device; forward-direction propagation path characteristic calculating means for calculating a forward-direction propagation path characteristic corresponding to the propagation path characteristic exhibited in the direction from the transmission device toward the reception device, based on the inverse-direction propagation path characteristic, reception-side calibration information regarding the plurality of radio reception units notified from the reception device, and transmission-side calibration information regarding the plurality of radio transmission units; and communication signal transmitting means for transmitting the plurality of communication signals weighted based on the forward-direction propagation path characteristic respectively from the plurality of transmission antennas.

Further, according to the present invention, there is provided a communication signal transmitting method, which is used in a radio communication system including: a reception device provided with a plurality of reception antennas and a plurality of radio reception units respectively connected to the plurality of reception antennas; and a transmission device provided with a plurality of transmission antennas and a plurality of radio transmission units respectively connected to the plurality of transmission antennas, the reception device being configured to acquire a plurality of communication signals transmitted respectively from the plurality of transmission antennas based on a propagation path characteristic exhibited in a direction from the transmission device toward the reception device, the communication signal transmitting method including the steps of: calculating an inverse-direction propagation path characteristic being a propagation path characteristic exhibited in a direction from the reception device toward the transmission device; calculating a forward-direction propagation path characteristic corresponding to the propagation path characteristic exhibited in the direction from the transmission device toward the reception device, based on the inverse-direction propagation path characteristic, reception-side calibration information regarding the plurality of radio reception units, and transmission-side calibration information regarding the plurality of radio transmission units; and transmitting the plurality of communication signals weighted based on the forward-direction propagation path characteristic respectively from the plurality of transmission antennas.

Effect of the Invention

The transmission device calculates the forward-direction propagation path characteristic exhibited in the direction from the transmission device toward the reception device, and transmits the communication signals weighted based thereon. Accordingly, the reception device can correctly demodulate the communication signal without performing the feedback of the propagation path characteristic from the reception device to the transmission device.

BEST MODE FOR CARRYING OUT THE INVENTION

Hereinafter, an embodiment according to the present invention is described in detail with reference to the drawings.

Figure 1:
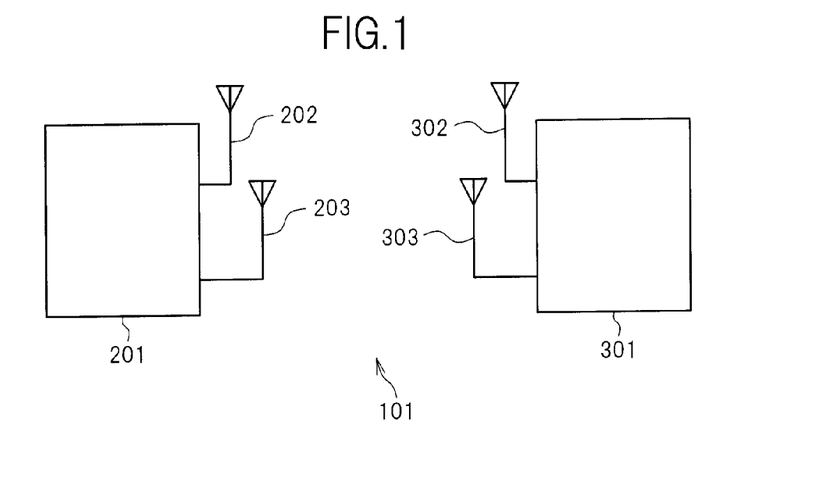
FIG. 1 A diagram illustrating a radio communication system according to the present invention.

FIG. 1 is a diagram illustrating a radio communication system 101 according to the present invention.

The radio communication system 101 includes a transmission device 201 provided with two transmission antennas 202 and 203 and a reception device 301 provided with two reception antennas 302 and 303.

Realized in this embodiment is an "open loop SVD-MIMO mode" in which the reception device 301 does not need to perform a feedback of a unitary matrix V to the transmission device 201.

Note that in this embodiment, for the sake of convenience, a communication device that transmits data in the open loop SVD-MIMO mode and a communication device that receives data are represented as "transmission device" and "reception device", respectively, and wordings such as "transmission antenna" are used in a similar manner. However, those wordings do not mean that, for example, a member named with "transmission" performs only transmission processing, and any member executes processing related to both the transmission processing and reception processing for signals in order to perform calculation of the propagation path characteristic and the like.

In the conventional SVD-MIMO mode in which a feedback is not performed, the transmission device 201 generates a propagation path characteristic $H_{rev}$ exhibited in a direction from the reception device 301 toward the transmission device 201 from reception-side known signals transmitted from the respective transmission antennas 302 and 303 and signals that are received by the respective transmission antennas 202 and 203 and are formed of the reception-side known signals superposed one on another, and this $H_{rev}$ is regarded as $H_{fwd}$ and used for performing the weighting on transmission signals.

In this embodiment, reception-side calibration information, transmission-side calibration information, and the propagation path characteristic $H_{rev}$ exhibited in the direction from the reception device 301 toward the transmission device 201 are used to calculate the propagation path characteristic $H_{fwd}$ dedicated to the direction from the transmission device 201 toward the reception device 301, and this propagation path characteristic $H_{fwd}$ is used for performing the weighting on transmission signals to thereby realize the communications based on the "open loop SVD-MIMO mode" with higher precision.

Figure 2:
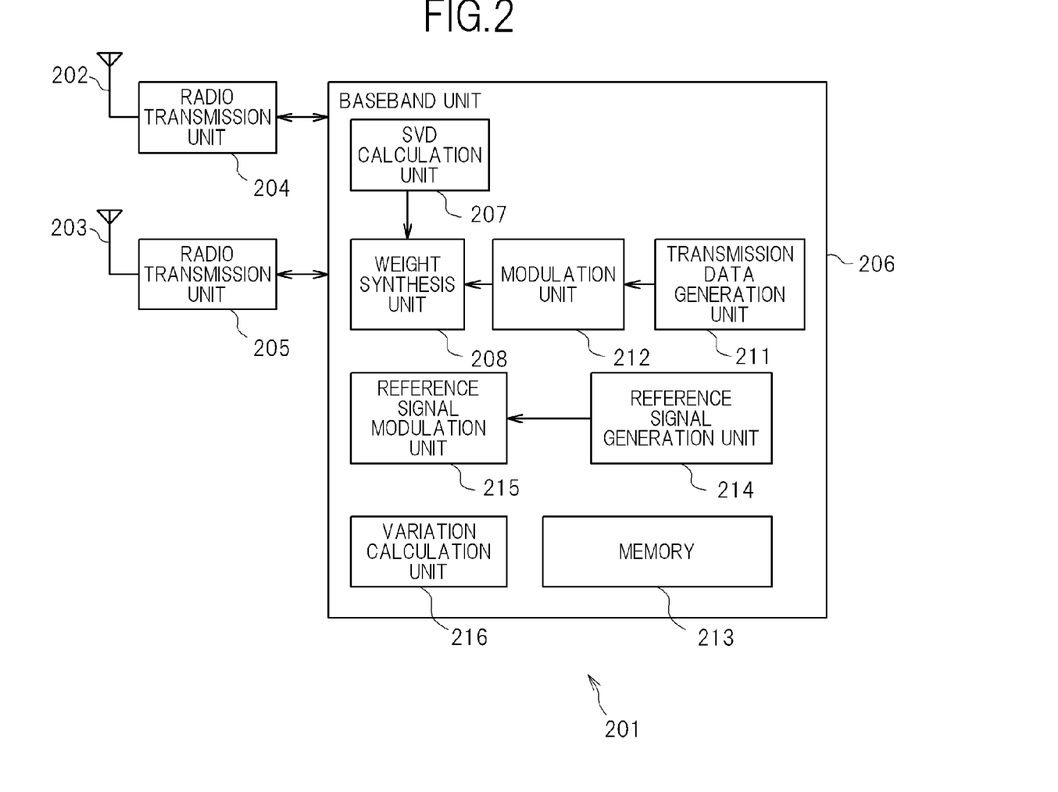
FIG. 2 A diagram illustrating a configuration of a transmission device.

FIG. 2 is a diagram illustrating a configuration of the transmission device 201. The transmission device 201 includes the transmission antennas 202 and 203, radio transmission units 204 and 205, and a baseband unit 206.

The transmission antennas 202 and 203 transmit signals respectively input from the radio transmission units 204 and 205 as radio waves. Further, the transmission antennas 202 and 203 receive radio waves, and output signals obtained from the radio waves respectively to the radio transmission units 204 and 205.

The radio transmission units 204 and 205 are formed of semiconductor circuits, perform downconversion processing or the like on the signals respectively input from the transmission antennas 202 and 203, and output the resultant signals to the baseband unit 206. Further, the radio transmission units 204 and 205 perform upconversion processing or the like on the signals input from the baseband unit 206, and output the obtained signals respectively to the transmission antennas 202 and 203.

The baseband unit 206 is formed of a CPU or the like, and generates and processes a baseband signal. The baseband unit 206 includes an SVD calculation unit 207, a weight synthesis unit 208, a transmission data generation unit 211, a modulation unit 212, a memory 213, a reference signal generation unit 214, a reference signal modulation unit 215, and a variation calculation unit 216.

The memory 213 stores various kinds of data used by the transmission device 201.

The reference signal generation unit 214 generates reference signals used for calculation of phase/amplitude variations which is performed by the variation calculation unit 216.

The reference signal modulation unit 215 performs mapping on the reference signals generated by the reference signal generation unit 214, and the generated signals are output from the transmission antennas 202 and 203 via the radio transmission units 204 and 205.

The variation calculation unit 216 calculates transmission-time variations Etx_A(k) being variation amounts of the reference signals that are respectively output from the transmission antennas 202 and 203 after passing through the radio transmission units 204 and 205 at the time of transmission, reception-time variations Erx_A(k) being variation amounts of the reference signals that respectively pass through the radio transmission units 204 and 205 after being input to the transmission antennas 202 and 203 at the time of reception, and transmission-side calibration information items (transmission-side calibration vectors) $C_A$ regarding the radio transmission units 204 and 205.

Here, "k" represents an antenna device number indicating each of the transmission antennas 202 and 203, and k assumes 1 or 2 in this embodiment provided with the two antennas. Further, "A" is a symbol indicating a value regarding the transmission device 201, and "B" is added to a value regarding the reception device 301 described later.

The variation calculation unit 216 calculates the transmission-time variations Etx_A(k) being the variation amounts of the communication signals that respectively flow through the radio transmission units 204 and 205 and the transmission antennas 202 and 203 at the time of transmission by detecting the variation amounts of the reference signals that are respectively output from the transmission antennas 202 and 203 after passing through the radio transmission units 204 and 205.

The transmission-time variations Etx_A (k) are calculated from the following Expression (2) by using the reference signals transmitted from the transmission antennas 202 and 203 and reception signals obtained by recursively receiving the reference signals by the transmission antennas 202 and 203.

[Numeral 2]

$$Etx\_A(k)=\Sigma(y(k,f)*s(k,f)') \qquad (2)$$

Here, "f" represents a frequency direction symbol, "s" represents a reference signal, and "y" represents a reception signal.

Further, the variation calculation unit 216 calculates the reception-time variations Erx_A(k) being the variation amounts of the communication signals that respectively flow through the transmission antennas 202 and 203 and the radio transmission units 204 and 205 at the time of reception by detecting the variation amounts of the reference signals that respectively pass through the radio transmission units 204 and 205 after being input to the transmission antennas 202 and 203.

The reference signals are respectively transmitted from the reception antennas 302 and 303 described later. The reception-time variation Erx_A (k) is calculated by the following Expression (3).

[Numeral 3]

$$Erx\_A(k)=\Sigma(y(k,f)*s(k,f)') \qquad (3)$$

Here, "f" represents a frequency direction symbol, "s" represents a reference signal, and "y" represents a reception signal.

Note that the variation amount obtained in this embodiment is at least one of an amplitude variation amount and a phase variation amount.

Then, the variation calculation unit 216 calculates the transmission-side calibration information item (transmission-side calibration vector) $C_A$ represented by the following Expression (4) based on the obtained transmission-time variation Etx_A (k) and reception-time variation Erx_A (k).

$$C_A=Erx\_A(k)/Etx\_A(k) \qquad (4)$$

The transmission-side calibration information items $C_A$ are saved in the memory 213.

The SVD calculation unit 207 calculates the inverse-direction propagation path characteristic $H_{rev}$ being the propagation path characteristic exhibited in the direction from the reception device 301 toward the transmission device 201, a forward-direction propagation path characteristic $H_{fwd}'$ being the propagation path characteristic exhibited in the direction from the transmission device 201 toward the reception device 301, on which the reception-side and transmission-side calibration information items are reflected, and the unitary matrices U and V.

The inverse-direction propagation path characteristic $H_{rev}$ is calculated based on the reception-side known signals transmitted from the reception antennas 302 and 303 described later and the superposed signals that are formed of the reception-side known signals superposed one on another and are received by the respective transmission antennas 202 and 203. The reception-side known signals are previously defined, and saved in the memory 213.

Next described is a method of calculating the forward-direction propagation path characteristic $H_{fwd}'$. The forward-direction propagation path characteristic $H_{fwd}'$ is represented by the following Expression (5).

$$H_{fwd}'=Etx\_A \times H_{fwd} \times Erx\_B \qquad (5)$$

Here, "$H_{fwd}$" represents a propagation path characteristic exhibited between the transmission antennas 202 and 203 and the reception antennas 302 and 303, and Expression (5) indicates that the forward-direction propagation path characteristic $H_{fwd}'$ taking variations between the antennas of the transmission device 201 and the reception device 301 into consideration is obtained by multiplying a propagation path characteristic H by the transmission-time variation Etx_A of the transmission device 201 and a reception-time variation Erx_B of the reception device 301.

Expression (5) can be modified as follows.

$$H_{fwd}=Etx\_A \times H \times Erx\_B \qquad (5)$$

$$=(Etx\_B \times H \times Erx\_A)\times(Erx\_B/Etx\_B)/(Erx\_A/Etx\_A) \qquad (6)$$

Here, in the same manner as (5), the inverse-direction propagation path characteristic $H_{rev}$ is represented as:

$$H_{rev}=Etx\_B \times H \times Erx\_A \qquad (7),$$

in the same manner as Expression (4), reception-side calibration information items $C_B$ regarding radio reception units 304 and 305 of the reception device 301 described later are represented as:

$$C_B=Erx\_B(k)/Etx\_B(k) \qquad (8),$$

and hence from Expressions (4), (6), (7), and (8), $$H_{fwd} = H_{rev} \times C_B/C_A \quad (9)$$

is obtained. The SVD calculation unit 207 calculates the forward-direction propagation path characteristic $H_{fwd}'$ by using Expression (9).

In addition, the SVD calculation unit 207 generates the unitary matrices U and V by subjecting the forward-direction propagation path characteristic $H_{fwd}'$ obtained from Expression (9) to the singular value decomposition, and outputs the unitary matrix V to the weight synthesis unit 208.

The transmission data generation unit 211 generates transmission data to be transmitted to the reception device 301, and outputs the generated transmission data to the modulation unit 212. The transmission data generated here also includes a transmission-side known signal to be used by the reception device 301 for calculating the propagation path characteristic.

The modulation unit 212 performs mapping on the transmission data input from the transmission data generation unit 211, and generates a transmission signal y.

The weight synthesis unit 208 performs the weighting by multiplying the unitary matrix V output from the SVD calculation unit 207 and the transmission signal y output from the modulation unit 212 together, and generates communication signals to be respectively transmitted from the transmission antennas 202 and 203. Note that the weighting is not performed on the transmission-side known signal.

Figure 3:
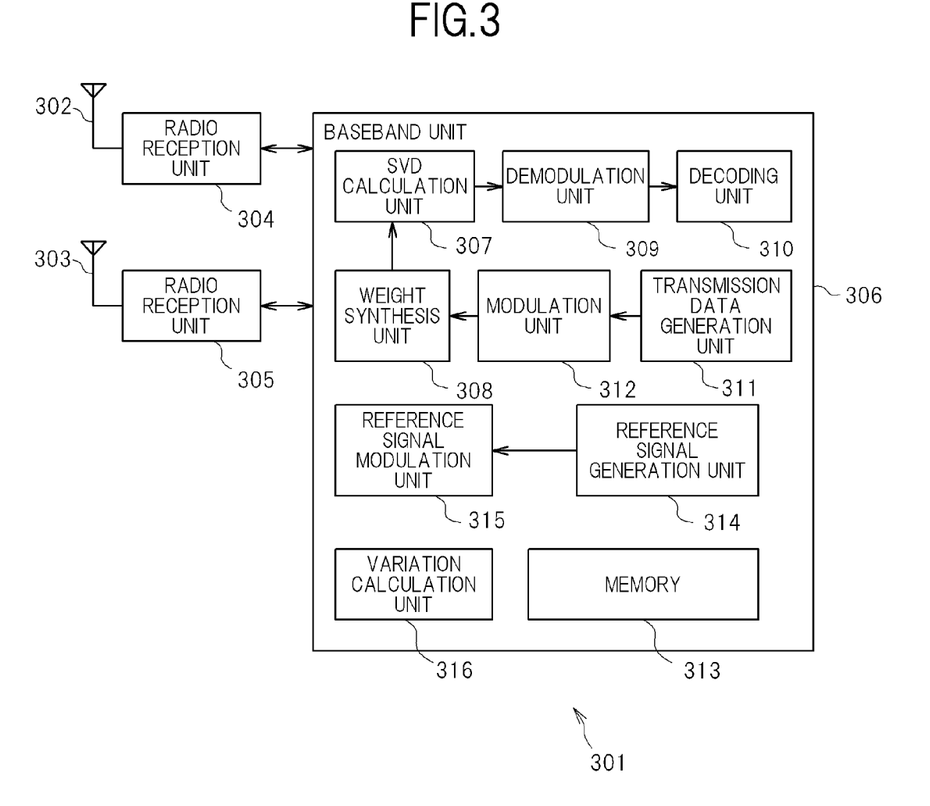
FIG. 3 A diagram illustrating a configuration of a reception device.

FIG. 3 is a diagram illustrating a configuration of the reception device 301. The reception device 301 includes the reception antennas 302 and 303, the radio reception units 304 and 305, and a baseband unit 306.

The reception antennas 302 and 303 transmit signals respectively input from the radio reception units 304 and 305 as radio waves. Further, the reception antennas 302 and 303 receive radio waves, and output the obtained signals respectively to the radio reception units 304 and 305.

The radio reception units 304 and 305 are formed of semiconductor circuits. The radio reception units 304 and 305 perform the downconversion processing or the like on the signals respectively input from the reception antennas 302 and 303, and output the obtained signals to the baseband unit 306. Further, the radio reception units 304 and 305 perform the upconversion processing or the like on the signals input from the baseband unit 306, and output the obtained signals respectively to the reception antennas 302 and 303.

The baseband unit 306 is formed of a CPU or the like, and generates and processes a baseband signal. The baseband unit 306 includes an SVD calculation unit 307, a weight synthesis unit 308, a demodulation unit 309, a decoding unit 310, a transmission data generation unit 311, a modulation unit 312, a memory 313, a reference signal generation unit 314, a reference signal modulation unit 315, and a variation calculation unit 316.

The memory 313 stores various kinds of data used by the reception device 301.

The reference signal generation unit 314 generates reference signals in the same manner as an operation performed by the transmission device 201, and the reference signals are transmitted via the reference signal modulation unit 315.

The variation calculation unit 316 calculates reception-time variations Erx_B (k), transmission-time variations Etx_B (k), and the reception-side calibration information items (reception-side calibration vectors) $C_B$ regarding the radio reception units 304 and 305 in the same manner as the variation calculation unit 216 of the transmission device 201.

The reception-time variations Erx_B (k) are obtained by calculating the variation amounts of the reference signals that respectively pass through the radio reception units 304 and 305 after being input to the reception antennas 302 and 303, and the transmission-time variations Etx_B (k) are obtained by calculating the variation amounts of the reference signals that are respectively output from the reception antennas 302 and 303 after passing through the radio reception units 304 and 305.

Then, the variation calculation unit 316 calculates the reception-side calibration information item (reception-side calibration vector) $C_B$ represented by the following Expression (10) based on the obtained transmission-time variation Etx_B (k) and reception-time variation Erx_B(k).

$$C_B = Erx\_B(k)/Etx\_B(k) \quad (10)$$

The reception-side calibration information items $C_B$ are, for example, included in the transmission data to be transmitted from the reception device 301 so that the transmission device 201 is notified thereof at the start of communications.

The SVD calculation unit 307 calculates the forward-direction propagation path characteristic $H_{fwd}'$ exhibited in the direction from the transmission device 201 toward the reception device 301, on which the reception-side and transmission-side calibration information items are reflected as well, based on the transmission-side known signals and the superposed signals that are formed of the transmission-side known signals transmitted from the transmission antennas 202 and 203 superposed one on another and are received by the respective reception antennas 302 and 303.

In addition, the SVD calculation unit 307 subjects the forward-direction propagation path characteristic $H_{fwd}'$ to the singular value decomposition to generate the unitary matrices U and V, and outputs the unitary matrix U and the unitary matrix V to the demodulation unit 309 and the weight synthesis unit 308, respectively.

The transmission data generation unit 311 generates transmission data to be transmitted to the transmission device 201. The transmission data generated here also includes a transmission-side known signal to be used by the transmission device 201 for calculating the propagation path characteristic.

The transmission data is transmitted via the modulation unit 312 and the weight synthesis unit 308 in the same manner as the transmission device 201. Note that the weight synthesis unit 308 does not perform the weighting on the transmission-side known signal in the same manner as the weight synthesis unit 208 of the transmission device 201.

The demodulation unit 309 acquires the communication signals transmitted from the transmission antennas 202 and 203 by performing demodulation by multiplying the signals that have been transmitted from the transmission antennas 202 and 203 and received by the reception antennas 302 and 303 and a conjugate transpose of the unitary matrix U generated by the SVD calculation unit 307 together.

The decoding unit 310 performs turbo decoding, a CRC check, or the like on the communication signals acquired by the demodulation unit 309.

Figure 4:
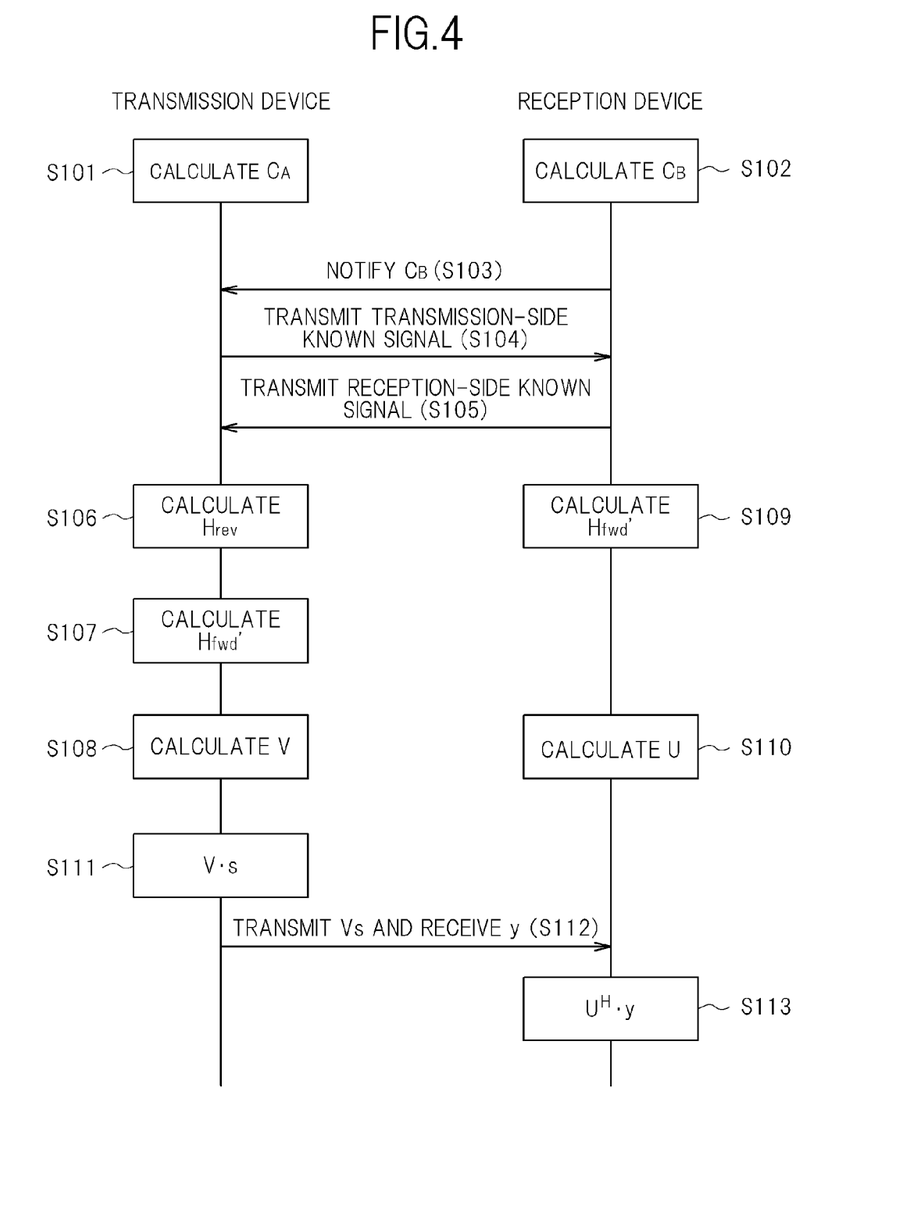
FIG. 4 A sequence illustrating an operation of the radio communication system.

Hereinafter, an operation of the radio communication system 101 according to this embodiment is described by use of a sequence.

FIG. 4 is the sequence illustrating the operation of the radio communication system 101.

First, the variation calculation unit 216 of the transmission device 201 calculates the transmission-side calibration information items $C_A$ on the radio transmission units 204 and 205 at a startup or before the start of communications (S101).

Further, the variation calculation unit 316 of the reception device 301 calculates the reception-side calibration information items $C_B$ on the radio reception units 304 and 305 (S102).

Subsequently, at the start of the communications, the reception device 301 notifies the transmission device 201 of the reception-side calibration information items $C_B$ (S103).

Subsequently, the transmission device 201 transmits the transmission-side known signals from the transmission antennas 202 and 203, and the reception device 301 receives the superposed signals, which are formed of those signals superposed one on another, by the reception antennas 302 and 303 (S104). Further, the reception device 301 transmits the reception-side known signals from the reception antennas 302 and 303, and the transmission device 201 receives the superposed signals, which are formed of those signals superposed one on another, by the transmission antennas 202 and 203 (S105).

The SVD calculation unit 207 of the transmission device 201 calculates the inverse-direction propagation path characteristic $H_{rev}$ from the reception-side known signals saved in the memory 213 and the superposed signals received in Step S104 (S106).

Subsequently, the SVD calculation unit 207 of the transmission device 201 calculates the forward-direction propagation path characteristic $H_{fwd}'$ from the transmission-side calibration information items $C_A$ calculated in Step S101, the reception-side calibration information items notified in Step S103, and the inverse-direction propagation path characteristic $H_{rev}$ calculated in Step S106 (S107).

Subsequently, the SVD calculation unit 207 of the transmission device 201 calculates the unitary matrix V by subjecting the forward-direction propagation path characteristic $H_{fwd}'$ calculated in Step S107 to the singular value decomposition (S108).

The SVD calculation unit 307 of the reception device 301 calculates the forward-direction propagation path characteristic $H_{fwd}'$ from the transmission-side known signals saved in the memory 313 and the superposed signals received in Step S104 (S109).

Subsequently, the SVD calculation unit 307 of the reception device 301 calculates the unitary matrix U by subjecting the forward-direction propagation path characteristic $H_{fwd}'$ calculated in Step S109 to the singular value decomposition (S110).

The weight synthesis unit 208 of the transmission device 201 multiplies the unitary matrix V and a transmission signal s together (S111). The obtained signals Vs are transmitted from the transmission antennas 202 and 203, and the superposed signals y formed of those signals superposed one on another are received by the reception antennas 302 and 303 (S112).

The reception device 301 performs demodulation by multiplying the conjugate transpose $U^H$ of the unitary matrix calculated in Step S110 and the signals y received in Step S112 together (S113).

According to the above-mentioned configuration, the unitary matrix is calculated by the transmission device 201, which eliminates the need to perform a feedback of the unitary matrix from the reception device 301 to the transmission device 201 and allows the reception device 301 to correctly demodulate the communication signals.

Note that the present invention is not limited to the above-mentioned embodiment, and various changes can naturally be made within the scope that does not depart from the gist of the present invention.

For example, this embodiment is described by taking the example in which the transmission device 201 and the reception device 301 have different configurations, but those devices may have the same configuration and are both configured to be able to execute the transmission processing and the reception processing that are described in this embodiment.

Further, for example, in this embodiment, the configuration in which the transmission device 201 and the reception device 301 are each provided with the two antennas is described, but the number of antennas may be increased, and the transmission device 201 and the reception device 301 may be configured to have a different number of antennas.

Further, for example, in this embodiment, the configuration of the radio communication system in the SVD-MIMO mode is described, but the present invention is not limited to this mode, and can be applied to radio communication systems in various modes in which the propagation path characteristic is used for the modulation of the transmission signal and the demodulation of the reception signal.

The invention claimed is:

1. A radio communication system, comprising:
a reception device provided with a plurality of reception antennas and a plurality of radio reception units respectively connected to the plurality of reception antennas; and
a transmission device provided with a plurality of transmission antennas and a plurality of radio transmission units respectively connected to the plurality of transmission antennas, the reception device being configured to acquire a plurality of communication signals transmitted respectively from the plurality of transmission antennas based on a propagation path characteristic exhibited in a direction from the transmission device toward the reception device, wherein:
the reception device comprises reception-side calibration information notifying means for notifying the transmission device of reception-side calibration information regarding the plurality of radio reception units; and
the transmission device comprises:
inverse-direction propagation path characteristic calculating means for calculating, as an inverse-direction propagation path characteristic, a propagation path characteristic exhibited in a direction from the reception device toward the transmission device;
forward-direction propagation path characteristic calculating means for calculating a forward-direction propagation path characteristic corresponding to the propagation path characteristic exhibited in the direction from the transmission device toward the reception device, based on the inverse-direction propagation path characteristic, the reception-side calibration information notified from the reception device, and transmission-side calibration information regarding the plurality of radio transmission units; and
communication signal transmitting means for transmitting the plurality of communication signals weighted based on the forward-direction propagation path characteristic respectively from the plurality of transmission antennas, and wherein:
the propagation path characteristic exhibited in the direction from the transmission device toward the reception device is calculated based on a plurality of transmission-side known signals transmitted respectively from the plurality of transmission antennas and a plurality of superposed signals that are formed of the plurality of transmission-side known signals superposed one on another and are received respectively by the plurality of reception antennas; and the propagation path characteristic exhibited in the direction from the reception device toward the transmission device is calculated based on a plurality of reception-side known signals transmitted respectively from the plurality of reception antennas and a plurality of superposed signals that are formed of the plurality of reception-side known signals superposed one on another and are received respectively by the plurality of transmission antennas.

2. A radio communication system, comprising:

a reception device provided with a plurality of reception antennas and a plurality of radio reception units respectively connected to the plurality of reception antennas; and a transmission device provided with a plurality of transmission antennas and a plurality of radio transmission units respectively connected to the plurality of transmission antennas, the reception device being configured to acquire a plurality of communication signals transmitted respectively from the plurality of transmission antennas based on a propagation path characteristic exhibited in a direction from the transmission device toward the reception device, wherein:

the reception device comprises reception-side calibration information notifying means for notifying the transmission device of reception-side calibration information regarding the plurality of radio reception units; and the transmission device comprises:

inverse-direction propagation path characteristic calculating means for calculating, as an inverse-direction propagation path characteristic, a propagation path characteristic exhibited in a direction from the reception device toward the transmission device;

forward-direction propagation path characteristic calculating means for calculating a forward-direction propagation path characteristic corresponding to the propagation path characteristic exhibited in the direction from the transmission device toward the reception device, based on the inverse-direction propagation path characteristic, the reception-side calibration information notified from the reception device, and transmission-side calibration information regarding the plurality of radio transmission units; and communication signal transmitting means for transmitting the plurality of communication signals weighted based on the forward-direction propagation path characteristic respectively from the plurality of transmission antennas, and wherein:

the reception-side calibration information is determined based on variation amounts of reference signals that respectively pass through the plurality of radio reception units after being input to the plurality of reception antennas and variation amounts of reference signals that are respectively output from the plurality of reception antennas after passing through the plurality of radio reception units; and the transmission-side calibration information is determined based on variation amounts of reference signals that respectively pass through the plurality of radio transmission units after being input to the plurality of transmission antennas and variation amounts of reference signals that are respectively output from the plurality of transmission antennas after passing through the plurality of radio transmission units.

3. The radio communication system according to claim 2, wherein the variation amount comprises at least one of an amplitude variation amount and a phase variation amount.

4. A radio communication system, comprising:

a reception device provided with a plurality of reception antennas and a plurality of radio reception units respectively connected to the plurality of reception antennas; and a transmission device provided with a plurality of transmission antennas and a plurality of radio transmission units respectively connected to the plurality of transmission antennas, the reception device being configured to acquire a plurality of communication signals transmitted respectively from the plurality of transmission antennas based on a propagation path characteristic exhibited in a direction from the transmission device toward the reception device, wherein:

the reception device comprises reception-side calibration information notifying means for notifying the transmission device of reception-side calibration information regarding the plurality of radio reception units; and the transmission device comprises:

inverse-direction propagation path characteristic calculating means for calculating, as an inverse-direction propagation path characteristic, a propagation path characteristic exhibited in a direction from the reception device toward the transmission device;

forward-direction propagation path characteristic calculating means for calculating a forward-direction propagation path characteristic corresponding to the propagation path characteristic exhibited in the direction from the transmission device toward the reception device, based on the inverse-direction propagation path characteristic, the reception-side calibration information notified from the reception device, and transmission-side calibration information regarding the plurality of radio transmission units; and communication signal transmitting means for transmitting the plurality of communication signals weighted based on the forward-direction propagation path characteristic respectively from the plurality of transmission antennas, and wherein:

the radio communication system is an MIMO system comprising the transmission device provided with M transmission antennas and the reception device provided with N reception antennas;

the propagation path characteristic exhibited in a direction from the plurality of transmission antennas toward the plurality of reception antennas is a radio channel matrix of N rows and M columns;

the propagation path characteristic exhibited in a direction from the plurality of reception antennas toward the plurality of transmission antennas is a radio channel matrix of M rows and N columns;

the reception-side calibration information is a calibration value vector formed of N elements; and the transmission-side calibration information is a calibration value vector formed of M elements.

5. The radio communication system according to claim 4, wherein:

the radio communication system is an SVD-MIMO system; and the plurality of communication signals transmitted respectively from the plurality of transmission antennas are weighted based on a complex conjugate transpose of an Mth-order unitary matrix obtained by subjecting the propagation path characteristic exhibited in the direction from the transmission device toward the reception device to singular value decomposition.

6. A transmission device, which is configured to transmit a plurality of communication signals to a reception device that is provided with a plurality of reception antennas and a plurality of radio reception units respectively connected to the plurality of reception antennas and is configured to acquire the plurality of communication signals transmitted respectively from a plurality of transmission antennas based on a propagation path characteristic exhibited in a direction from the transmission device toward the reception device, the transmission device comprising:

the plurality of transmission antennas;

a plurality of radio transmission units respectively connected to the plurality of transmission antennas;

inverse-direction propagation path characteristic calculating means for calculating, as an inverse-direction propagation path characteristic, a propagation path characteristic exhibited in a direction from the reception device toward the transmission device;

forward-direction propagation path characteristic calculating means for calculating a forward-direction propagation path characteristic corresponding to the propagation path characteristic exhibited in the direction from the transmission device toward the reception device, based on the inverse-direction propagation path characteristic, reception-side calibration information regarding the plurality of radio reception units notified from the reception device, and transmission-side calibration information regarding the plurality of radio transmission units; and communication signal transmitting means for transmitting the plurality of communication signals weighted based on the forward-direction propagation path characteristic respectively from the plurality of transmission antennas, wherein the propagation path characteristic exhibited in the direction from the transmission device toward the reception device is calculated based on a plurality of transmission-side known signals transmitted respectively from the plurality of transmission antennas and a plurality of superposed signals that are formed of the plurality of transmission-side known signals superposed one on another and are received respectively by the plurality of reception antennas; and the propagation path characteristic exhibited in the direction from the reception device toward the transmission device is calculated based on a plurality of reception-side known signals transmitted respectively from the plurality of reception antennas and a plurality of superposed signals that are formed of the plurality of reception-side known signals superposed one on another and are received respectively by the plurality of transmission antennas.

7. A communication signal transmitting method, which is used in a radio communication system comprising:

a reception device provided with a plurality of reception antennas and a plurality of radio reception units respectively connected to the plurality of reception antennas; and a transmission device provided with a plurality of transmission antennas and a plurality of radio transmission units respectively connected to the plurality of transmission antennas, the reception device being configured to acquire a plurality of communication signals transmitted respectively from the plurality of transmission antennas based on a propagation path characteristic exhibited in a direction from the transmission device toward the reception device, the communication signal transmitting method comprising the steps of:

calculating an inverse-direction propagation path characteristic being a propagation path characteristic exhibited in a direction from the reception device toward the transmission device;

calculating a forward-direction propagation path characteristic corresponding to the propagation path characteristic exhibited in the direction from the transmission device toward the reception device, based on the inverse-direction propagation path characteristic, reception-side calibration information regarding the plurality of radio reception units, and transmission-side calibration information regarding the plurality of radio transmission units; and transmitting the plurality of communication signals weighted based on the forward-direction propagation path characteristic respectively from the plurality of transmission antennas, wherein the propagation path characteristic exhibited in the direction from the transmission device toward the reception device is calculated based on a plurality of transmission-side known signals transmitted respectively from the plurality of transmission antennas and a plurality of superposed signals that are formed of the plurality of transmission-side known signals superposed one on another and are received respectively by the plurality of reception antennas; and the propagation path characteristic exhibited in the direction from the reception device toward the transmission device is calculated based on a plurality of reception-side known signals transmitted respectively from the plurality of reception antennas and a plurality of superposed signals that are formed of the plurality of reception-side known signals superposed one on another and are received respectively by the plurality of transmission antennas.

* * * * *